US010191851B2

United States Patent
Shu et al.

(10) Patent No.: US 10,191,851 B2
(45) Date of Patent: Jan. 29, 2019

(54) METHOD FOR DISTRIBUTED TRANSACTION PROCESSING IN FLASH MEMORY

(71) Applicant: TSINGHUA UNIVERSITY, Beijing (CN)

(72) Inventors: Jiwu Shu, Beijing (CN); Youyou Lu, Beijing (CN); Fei Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/980,346

(22) Filed: Dec. 28, 2015

(65) Prior Publication Data

US 2017/0024324 A1 Jan. 26, 2017

(30) Foreign Application Priority Data

Jul. 22, 2015 (CN) .......................... 2015 1 0435889

(51) Int. Cl.
*G06F 12/00* (2006.01)
*G06F 12/1009* (2016.01)
*G06F 3/06* (2006.01)

(52) U.S. Cl.
CPC ........ *G06F 12/1009* (2013.01); *G06F 3/0604* (2013.01); *G06F 3/064* (2013.01);
(Continued)

(58) Field of Classification Search
CPC .. G06F 12/1009; G06F 3/0604; G06F 3/0631; G06F 3/064; G06F 3/0679; G06F 2212/7201
See application file for complete search history.

(56) References Cited

PUBLICATIONS

Yi et al., Cx: Concurrent Execution for the Cross-Server Operations in a Distributed File System, 2012 IEEE International Conference on Cluster Computing, Beijing, 2012, pp. 99-107.[retrieved from internet—Mar. 1, 2017]<URL: http://ieeexplore.ieee.org/stamp/stamp.jsp?tp=&arnumber=6337770&isnumber=6337766><doi: 10.1109/CLUSTER.2012.65>.*

(Continued)

*Primary Examiner* — Daniel D Tsui
*Assistant Examiner* — Nicholas A. Paperno
(74) *Attorney, Agent, or Firm* — Wayne & Ken, LLC; Tony Hom (57) ABSTRACT

The present invention discloses a method for distributed transaction processing in a flash memory, including the following steps: S1. performing two-phase commit on a transaction, removing a state log record of a two-phase commit protocol, and internalizing as an operation on flash memory metadata in a transaction interface; S2. storing a temporary data object as a shadow version while performing the transaction, using a shadow mapping table to store the address of the shadow version or a state of a page, using page metadata to record transaction information, using a transaction metadata page to record a transaction state, and using a transaction state table to record an address of the transaction metadata page; and S3. when the coordinator or a participant fails, recovering the FTL mapping table, shadow mapping table, and transaction state table with the help of stored data and flash memory metadata. The present invention has the following advantages: the number of logs is reduced, and performance of transaction processing in a distributed flash memory environment is improved.

4 Claims, 5 Drawing Sheets

(52) U.S. Cl.
CPC .......... *G06F 3/0631* (2013.01); *G06F 3/0679* (2013.01); *G06F 2212/7201* (2013.01)

(56) References Cited

PUBLICATIONS

Lu et al., "LightTx: A lightweight transactional design in flash-based SSDs to support flexible transactions," 2013 IEEE 31st International Conference on Computer Design (ICCD), Asheville, NC, 2013, pp. 115-122.[retrieved from internet—Mar. 1, 2017]<URL: http://ieeexplore.ieee.org/stamp/stamp.jsp?tp=&arnumber=6657033 &>doi: 10.1109/ICCD.2013.6657033.*

Gray et al. "The recovery manager of the System R database manager." ACM Computing Surveys (CSUR) 13.2 (1981): 223-242.[retrieved from internet—Mar. 1, 2017]<URL:http://delivery. acm.org/10.1145/360000/356847/p223-gray.pdf?ip=151.207.250.41 &id=356847&acc=ACTIVE%20SERVICE&key= C15944E53D0ACA63%2E4D4702B0C3E38B35% 2E4D4702B0C3E38B35%2E4D4702B0C3E38B35&C.*

* cited by examiner

Fig. 1

| Interface | Description |
|---|---|
| TxRead(LPN, TxID...) | The transcation is read |
| TxWrite(buf, LPN, TxID, TxCNT...) | The transaction is written |
| TxCommit(LPN, TxID...) | The transaction is committed |
| TxAbort(LPN, TxID...) | The transaction is aborted |
| TxStatus(LPN, TxID...) | The transaction state is obtained |

| PPN | BUF | TXID, LPN,TxCNT |
|---|---|---|
| | | |
| | | |

(1)

| PPN | BUF | TXID, LPN,TxCNT |
|---|---|---|
| PPN1 | BUF1 | TXID1, LPN1,TxCNT1 |
| | | |

(2)

| PPN | BUF | TXID, LPN,TxCNT |
|---|---|---|
| PPN1 | BUF1 | TXID1, LPN1,TxCNT1 |
| PPN2 | COMMIT | TXID1 |

METHOD FOR DISTRIBUTED TRANSACTION PROCESSING IN FLASH MEMORY

CROSS-REFERENCE TO RELATED APPLICATIONS

This application is a continuation in part of, and claims priority to, Chinese Patent Application No. 201510435889.0 with a filing date of Jul. 22, 2015. The content of the aforementioned application, including any intervening amendments thereto, is incorporated herein by reference.

TECHNICAL FIELD

The present invention relates to the field of flash memory storage technologies, and in particular, to a method for distributed transaction processing in a flash memory.

BACKGROUND

A flash memory is a non-volatile memory and is classified into a NOR type and a NAND type according to different internal connection structures. The NAND type has a relatively simple structure and is therefore widely applied to a flash memory SSD. A flash memory unit adopts unidirectional programming, reading and writing are performed in units of pages, erasing is performed in units of blocks, and the flash memory unit needs to be erased before a page is rewritten. Therefore, a remote data update policy is used in the flash memory. A flash memory page includes an OOB (out-of-band) area, which may be used as page metadata.

Because of the out-of-place update of the flash memory, new versions and old versions of data can coexist in the storage, and this is suitable for transaction processing. An objective of the transaction processing is to ensure atomicity of a transaction operation and ensure consistency between servers even when a failure occurs during execution of a transaction. In a distributed transaction, the process of executing the transaction is controlled by using an atomic commit protocol to common two-phase commit protocol), and the temporary data version and transaction execution state are recorded by using the logging technology. In two-phase commit of the transaction, state log writing is performed five times. In addition, a log includes a temporary version whose size is the same as that of transaction data. Too many times of log writing bring about double overheads of time and space. Therefore, some studies attempt to modify the mapping (a shadow paging technology) to avoid operation overheads of writing back from logs. However, because the conventional storage has limited random read and write performance and a locality corruption may also affect performance, the conventional storage does not use the method. The flash memory storage can overcome the foregoing disadvantage. In some centralized transaction designs based on a flash memory, temporary data is organized as a shadow version, and the shadow version is updated to an FTL mapping table only when a transaction is committed, which avoids a process of writing data into a log first and then writing back the data. However, in a distributed transaction, to improve transaction processing performance by reducing the number of logs (temporary version records and state records), it needs to be ensured that transaction logic is performed normally and that sufficient redundant data is available during failure recovery. In addition to log operations, too many communications also bring about overheads. In addition, the two-phase commit protocol is a blocking protocol, which needs large overheads when the communications are blocked.

SUMMARY

The present invention intended to solve at least one of the foregoing technical issues.

Therefore, an objective of the present invention is to provide a method for distributed transaction processing in a flash memory.

To achieve the foregoing objective, according to a first aspect of the present invention, a method for distributed transaction processing in a flash memory is disclosed in an embodiment and includes the following steps: S1. performing two-phase commit on a transaction, removing a state log record of a two-phase commit protocol, internalizing as an operation on flash memory metadata in a transaction interface, and using final commit of a coordinator as a distributed transaction end identifier, S2. in a process of performing the transaction, storing a temporary data object as a shadow version, using a shadow mapping table to store an address of the shadow version or a state of a page in the transaction processing, using page metadata to record transaction information, using a transaction metadata page to record a transaction state, and using a transaction state table to record an address of the transaction metadata page; and S3. when the coordinator or a participant fails, scanning a part of the storage, reading the flash memory metadata, and recovering an FTL mapping table, the shadow mapping table, and the transaction state table to determine the state of the transaction in the two-phase commit.

In the method for distributed transaction processing in a flash memory according to the embodiment of the present invention, the number of state recording times may be greatly reduced because only one transaction metadata page operation and a related mapping table operation are needed to complete state recording; the amount of written data is reduced, so it can be written within approximate one flash memory page only. This method avoids an operation of writing back new data from a log to an original address, and may implement transformation between a new data version and an old data version by modifying the FTL mapping table. In conclusion, this method reduces overheads of state recording and temporary version recording, so the performance of the distributed transaction processing is improved; and because the size of a scanned space is smaller during recovery, overheads of transaction state recovery are also smaller.

In addition, the method for distributed transaction processing in a flash memory according to the foregoing embodiment of the present invention may further have the following additional technical features:

Furthermore, the shadow mapping table is a memory structure, which records the address of the shadow version in the first phase of the two-phase commit and records the state of the page participating in the transaction in the second phase of the two-phase commit.

Furthermore, in the process of performing the transaction by the coordinator or the participant, an additional flash memory page is allocated as the transaction metadata page to record the transaction state in the second phase of the two-phase commit.

Furthermore, the transaction state table is a persistently stored mapping table, and before the transaction metadata page is written, the transaction state table stores a mapping from a transaction ID to the address of the transaction metadata page.

Furthermore, the page in the shadow mapping table is in the first phase of the two-phase commit; the page metadata is used to determine whether the transaction is ready: and transactions in the transaction state table are in the second phase of the two-phase commit, where the transaction metadata page stored in the transaction state table is used to determine whether the transaction is committed or aborted.

Furthermore, the step S2 further includes: when the transaction is written, the shadow mapping table stores the location of new data;

the page metadata records logic page number, transaction ID, the number of transaction pages, and when the transaction is committed, the location of the new data is updated to the FTL mapping table and is changed to a user readable state;

the shadow mapping table records commit identifier, and the transaction metadata page records transaction commit; if the transaction is aborted, the shadow mapping table records an abort identifier, and the transaction metadata page records transaction abort, and the new data is set as invalid;

if a flash memory block is used completely and all transactions on the flash memory block are completed, the flash memory block is marked as a CHECKED block; if there is an uncompleted transaction, the flash memory block is marked as a WAIT block: if the flash memory block is partially used, the flash memory block is marked as an UPDATE block; if the flash memory block is not used, the flash memory block is marked as a FREE block; and the first page of the block is used to differentiate a block state; and when a failure occurs in the two-phase commit process, the FTL mapping table, the shadow mapping table, and the transaction state table are recovered to determine the transaction state, and the WAIT block and the UPDATE block are scanned.

The additional aspects and advantages of the present invention will be provided in the following descriptions, and some of them will become more apparent in the following descriptions or be understood through the practice of the present invention.

BRIEF DESCRIPTION OF DRAWINGS

The foregoing and/or additional aspects and advantages of, the present invention will become more apparent and understandable in descriptions of the embodiments in combination with the accompanying drawings, where.

DESCRIPTION OF EMBODIMENTS

Embodiments of the present invention are described in detail as follows. Examples of the embodiments are illustrated in the accompanying drawings, where identical or similar numbers always represent identical or similar components or components having identical or similar functions. The following embodiments described with reference to the accompanying drawings are exemplary only and are only used to explain the present invention and should not be understood as limitations on the present invention.

In the descriptions of the present invention, it should be understood that directions or location relationships indicated by terms "center", "longitudinal", "lateral", "up", "down", "front", "rear", "left". "right", "vertical", "horizontal" "top", "bottom", "internal", and "external" are directions or location relationships based on the accompanying drawings. and are used only for describing the present invention and simplifying the descriptions, which do not indicate or imply that a corresponding apparatus or component must have a specific direction and be constructed and operated in a specific direction, and therefore should not be understood as limitations on the present invention. In addition, terms "first" and "second" are used only for description purposes and should not be understood as indications or implications of relative significance.

In the descriptions of the present invention, it should be noted that unless otherwise specified and defined, terms "installation", "interconnection" and "connection" should be understood in a broad sense, for example, the connection may be a fixed connection, a detachable connection or an integrated connection, may be a mechanical connection or an electrical connection, may be a direct connection or a connection through an intermediate medium, or may be an internal connection between two components. A person of ordinary skill in the art may understand specific meanings of the foregoing terms in the present invention according to actual situations.

These aspects and other aspects of the embodiments of the present invention will be made clearer with reference to the following descriptions and the accompanying drawings. In these descriptions and accompanying drawings, some specific implementation manners in the embodiments of the present invention are disclosed to represent some manners of implementing the principles of the embodiments of the present invention. However, it should be understood that the scope of the embodiments of the present invention is not limited thereto. On the contrary, the embodiments of the present invention should include all changes, modifications, and equivalents that fall within the spirit and scope of the appended claims.

The following describes, with reference to an accompanying drawing, a method for distributed transaction processing in a flash memory according to an embodiment of the present invention.

For better understanding, the following first describes a distributed flash memory environment and a distributed transaction. In some distributed systems such as a distributed file system and a distributed database management system, transaction operations are distributed on different servers, which is called a distributed transaction. Transaction processing is generally performed by using a two-phase commit protocol. The distributed system has an increasingly high requirement for high performance, while the flash memory has higher read and write performance than a conventional storage. Therefore, the distributed system begins to use the flash memory as a storage medium on a sewer. In this way, a flash memory based distributed environment is formed. When a transaction is performed, multiple servers participate in the process, where one server plays the role of a coordinator, the other servers are participants, and the coordinator communicates with the participants to control the operation and commit of the transaction.

In the descriptions of the present invention, it should be noted that a term with an "LPN" (Logic Page Number) prefix represents a logic page number, that is, an address of a flash memory page used by a user space program, and that a term with a "PPN" (Physical Page Number) prefix represents a physic page number, that is, an address of a physic page actually operated by the flash memory. A term with a "TxID" prefix represents a transaction ID, and is used to differentiate transactions. A "TxCNT" represents the quantity of flash memory pages operated by a transaction on a server. A term with a "BUF" prefix represents data of a flash memory page. A "GMT" (Global Mapping Table) represents an FTL mapping table, and is responsible for managing a mapping from a logic address to a physical address. The user space program operates one LPN, and finds a corresponding PPN by using the FTL mapping table, and then performs operations on an actual location indicated by the PPN. A "GST" (Global Shadow Table) represents a shadow mapping table with a structure similar to that of the GMT, and also implements an address mapping. It mainly records the addresses of a temporary version during transaction operations. and can query for the temporary version by using the LPN when the transaction is uncommitted. A "GTT" (Global Transaction Table) represents a transaction state table with a structure similar to that of the GMT, and records the addresses of transaction metadata pages. An "OP-REQ" represents an operation request; a "VOTE-REQ" represents a voting request, which is used by the coordinator to ask a participant whether a transaction operation is completed: a "COMMIT-REQ" and an "ABORT-REQ" represent a commit request and an abort request respectively; after making a decision with respect to a global transaction, the coordinator sends a corresponding request to a participant; an "ACK" represents acknowledgement information that the participant returns to the coordinator after the participant executes the global decision. "COMMIT" and "ABORT" represent a transaction commit identifier and a transaction abort identifier.

The following describes, with reference to an accompanying drawing, a method for distributed transaction processing in a flash memory according to an embodiment of the present invention.

Figure 1:
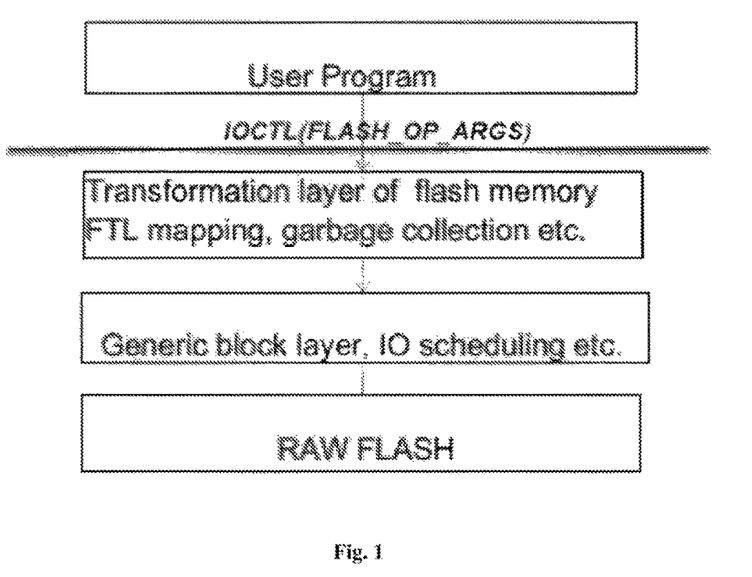
FIG. 1 is a schematic diagram of a process of accessing a flash memory in a user space according, to an embodiment of the present invention.
Figure 2:
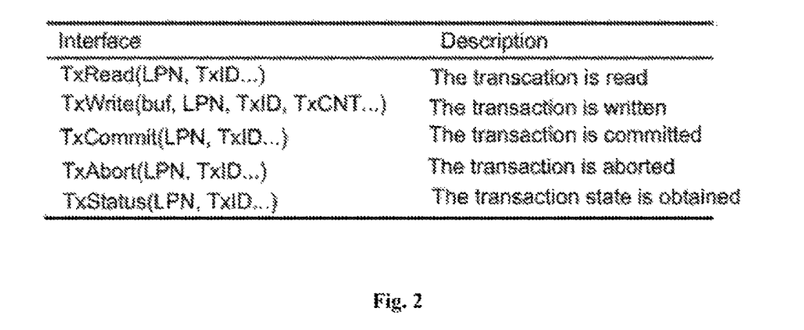
FIG. 2 is a diagram of descriptions of main transaction operation interfaces and main parameters thereof according to an embodiment of the present invention.

When transaction processing is performed by using a flash memory as a storage medium, an operation interface for implementing the flash memory needs to be first designed. FIG. 1 is a schematic diagram of a flash memory operation performed in a user space, where a transaction operation interface is implemented at a transformation layer of a flash memory, and a transaction interface is exported from a core to the user space by using an IOCTL interface of a LINUX operating system. FIG. 2 illustrates main transaction operation interfaces and basic parameters thereof.

Figure 3:
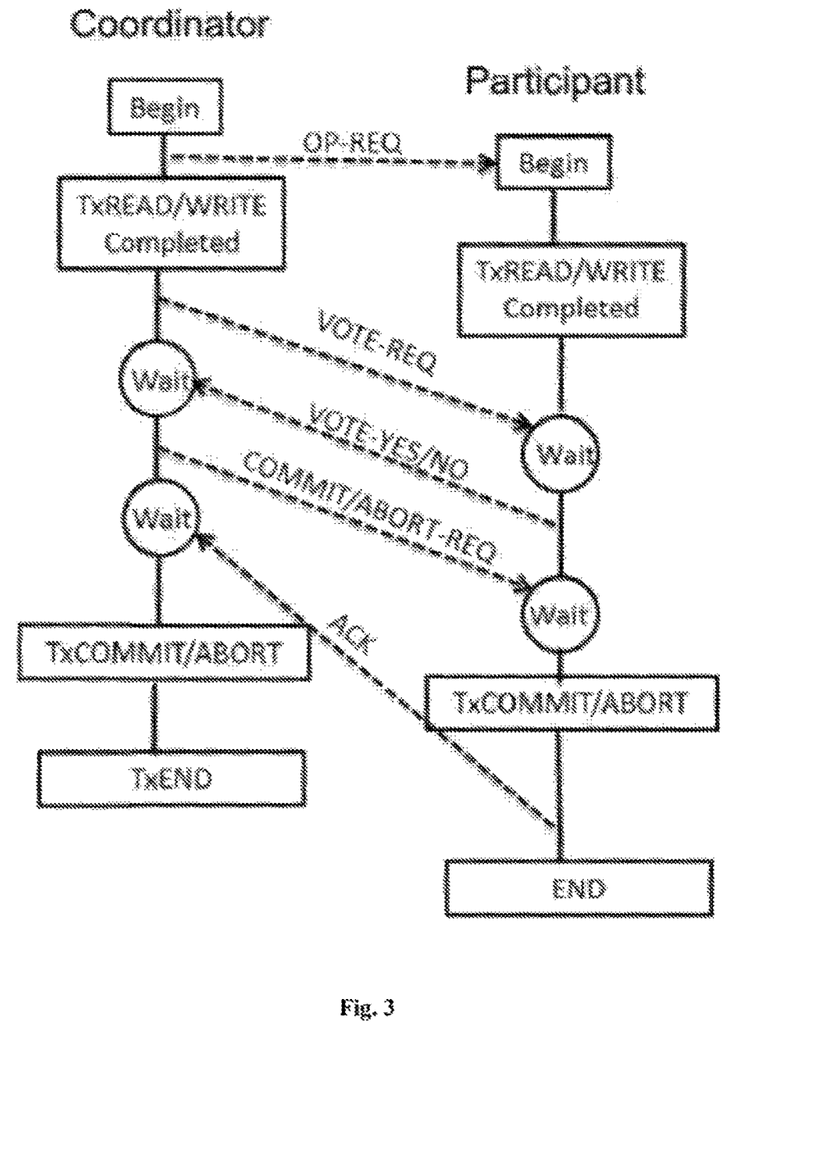
FIG. 3 is a schematic diagram of distributed transaction processing in a flash memory according to an embodiment of the present invention.

FIG. 3 is a schematic diagram of distributed transaction processing in a flash memory according to the present invention. The distributed transaction processing in a flash memory includes the following steps:

(1) A coordinator first starts transaction processing locally, and sends an operation request command (OP-REQ) to the participants to start the transaction processing.

(2) The coordinator and the participants record read data and written data (TxREAD or TxWrite) of a transaction respectively in a shadow page manner.

(3) The coordinator sends a voting request command (VOTE-REQ) to the participants, and waits for a yes (VOTE-YES) or no (VOTE-NO) response from the participant.

(4) The coordinator determines a transaction commit state according to a local execution result and the messages returned by the participants, and sends a transaction commit command (COMMIT-REQ) or a transaction abort command (ABORT-REQ) to the participants.

(5) The participant executes a local commit (TxCOMMIT) or abort (TxABORT) operation, and records an operation result in flash memory metadata.

(6) The participants send the acknowledgement (ACK) commands to the coordinator, notifying the coordinator that the execution ends (END).

(7) After receiving the ACK command, the coordinator executes a local commit ((TxCOMMIT) or abort (TxABORT) operation, records an operation result in the flash memory metadata, and marks that the transaction ends (TxEND).

Figure 4:
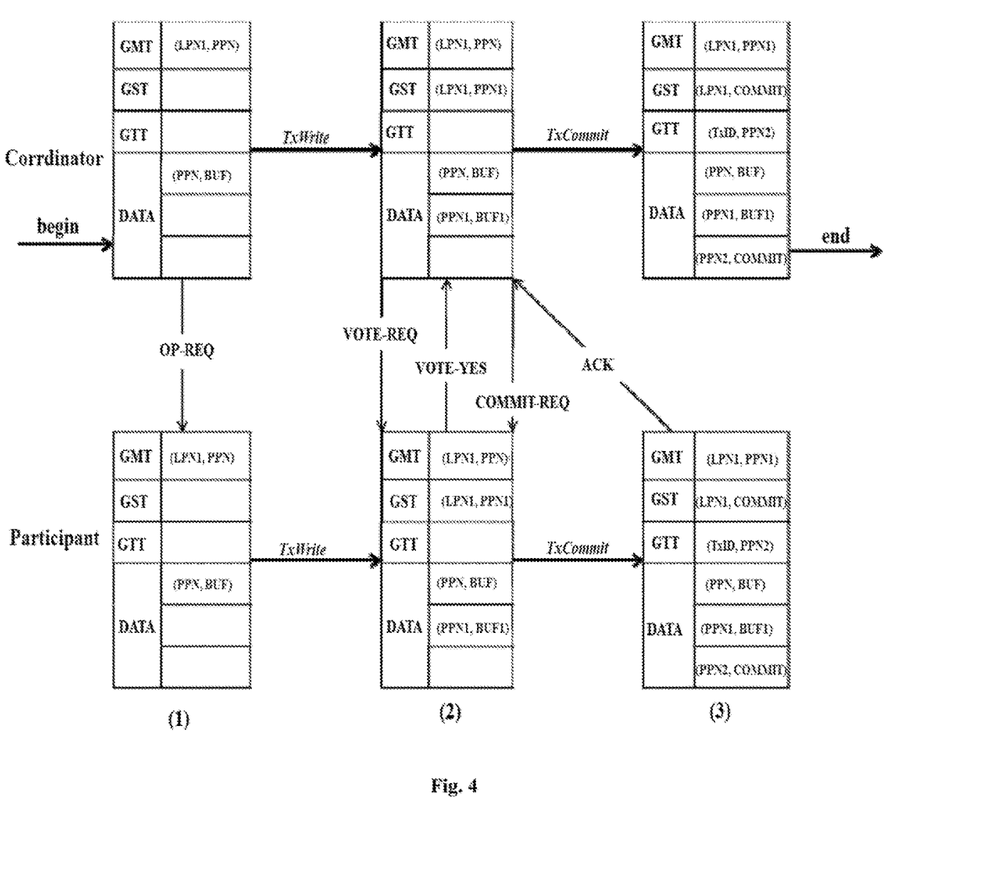
FIG. 4 is a schematic diagram of a process of executing a distributed transaction according to an embodiment of the present invention.

FIG. 4 is a schematic diagram of operations performed by a coordinator and the participants in a distributed transaction process. In FIG. 4, the transaction ID is TxID1, and a global transaction operation includes updating the page with the logical address of LPN1 on two servers: and before a transaction is performed, a physical address corresponding to the LPN is a PPN.

The coordinator starts the transaction, and sends an OP-REQ to the participants. The coordinator and the participants invoke the transaction write interface to perform a specific update operation. New data is written to the PPN1, and a GST stores a mapping (LPN1, PPN1). In this case, by querying for the transaction state, it may be found that LPN1 is mapped to the PPN1 in GST and whose addresses is mapped inconsistent in GMT and GST. Although the transaction operation is completed, the transaction is still in the first phase.

Next, the coordinator sends a VOTE-REQ, asking the participant for an operation result. The participant has already written new data BUF1 to the PPN1, and returns a VOTE-YES: the coordinator also writes the new data BUF1 to the PPN1 and makes a "commit" decision. The coordinator sends a COMMIT-REQ to the participant, and the participants perform a commit operation. A transaction metadata page PPN2 records the transaction state as "committed", and a mapping (TxID1, PPN2) is added to the GTT to record the address of the transaction metadata page, and (LPN1, PPN) in the GMT is updated to (LPN1, PPN1). The PPN data is set as invalid and waits for garbage collection. In the GST, a location that corresponds to the LPN1 is set to a commit code to assist state query. If state query is performed at this time, the PPN2 may be found in the GTT by inputting the TxID1, and it is determined that the transaction state is committed. If no other transactions modify the LPN1, it may also be determined, by inputting the LPN1 in the GST, the transaction state is committed. After the commit is completed, the participants send an ACK to the coordinator, and the coordinator completes the commit, indicating that the transaction ends.

If a sub-transaction operation of the participants or the coordinator cannot be completed, that is, the coordinator receives a VOTE-NO, the coordinator makes an abort decision, the GMT is not updated, and the transaction metadata page records an "aborted" state.

Figure 5:
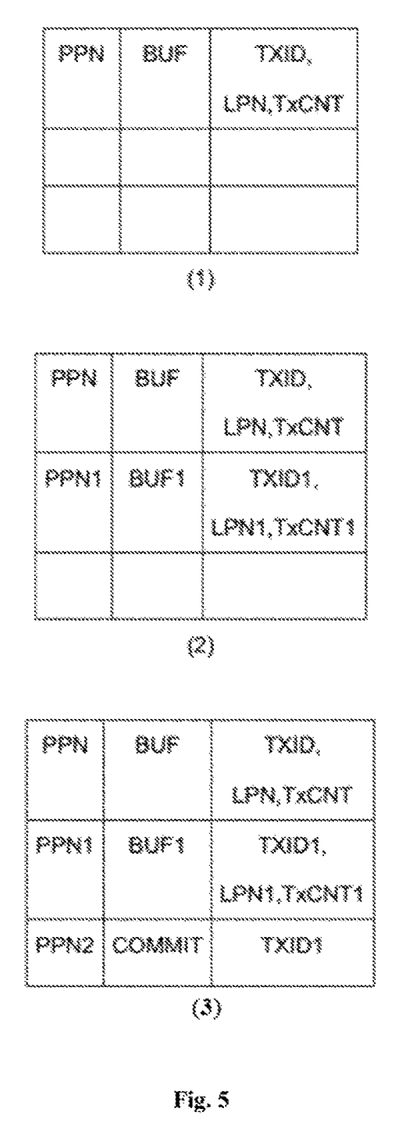
FIG. 5 is a schematic diagram of page metadata in a process of executing a distributed transaction according to an embodiment of the present invention.

FIG. 5 further shows the content of a data page in the three states in FIG. 4, where the content is mainly used to represent data stored in a metadata area of the page. A transaction data page. for example, PPN or PPN1, records a transaction ID, a page logic address, and TxCNT. The TxCNT is mainly used in a case in which a participant performs a multipage operation. In a last page operation, the TxCNT is set to the quantity of pages operated by the participant and is used to indicate that the participant has completed a sub-transaction operation. A transaction metadata page, for example, a PPN2, records the transaction ID.

In a process of performing a transaction, a manner similar to that of a log is used to allocate a flash memory space. If all pages on a block are occupied and a transaction related to these pages has already been completed, the block is marked as a CHECKED block: if there is a transaction that is not completed, the block is marked as a WAIT block; a block that is not used is marked as a FREE block, and a block that is partially used is marked as an UPDATE block. For a transaction operation, a space is allocated from the UPDATE block. If the space of the UPDATE block has been allocated completely, the UPDATE block is marked as a WAIT block or a CHECKED block, and then a block is extracted from a FREE block and is used as an UPDATE block. The foregoing process is continued, and a mapping (GTT, GMT) persistence operation is performed only when the state of the UPDATE block is changed.

Therefore, when a failure occurs, the GMT and GTT memory structure not written back is lost, and the GST is also lost. In this case, recovery needs to be performed by scanning the WAIT block and the UPDATE block.

Figure 6:
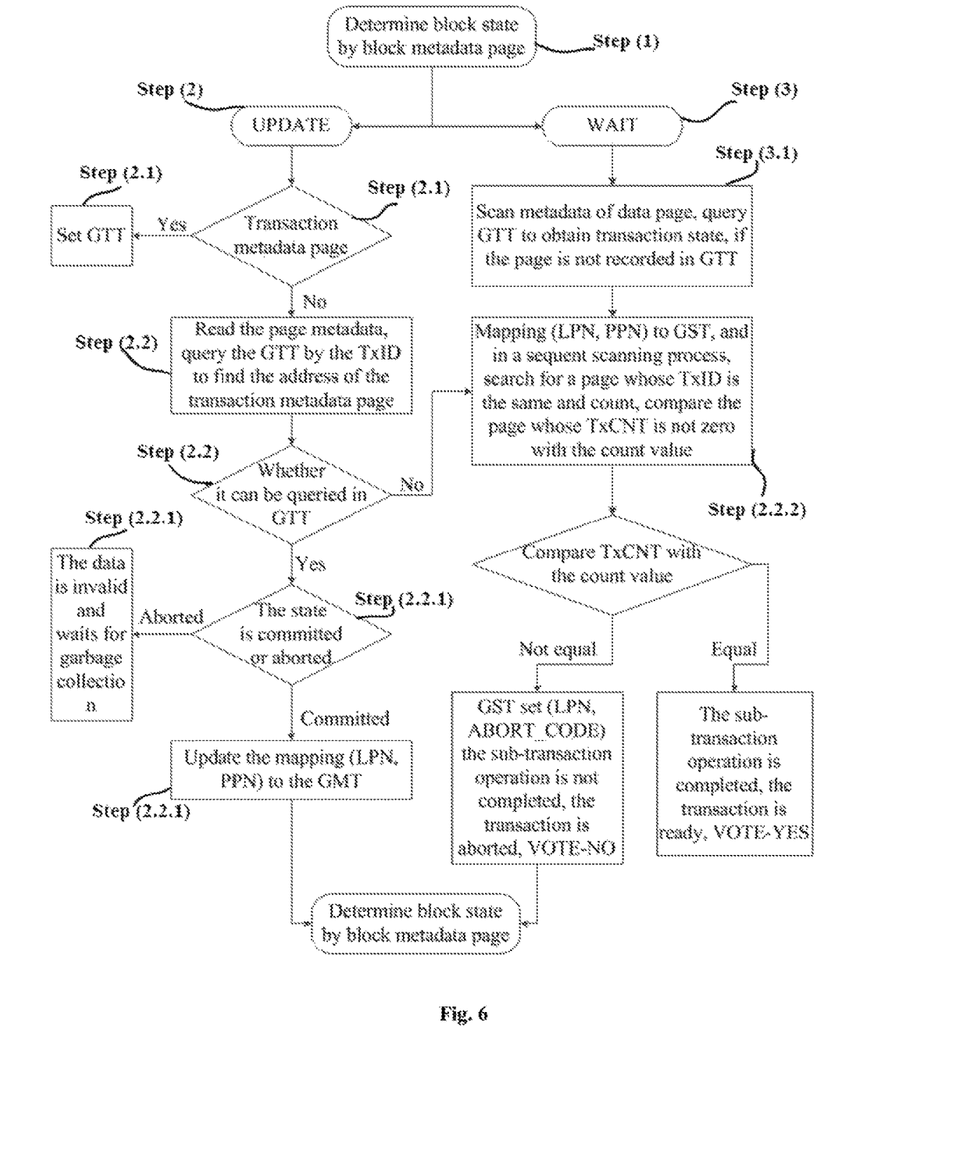
FIG. 6 is a flowchart of recovering a transaction state in a coordinator or a participant when the coordinator or the participant fails according to an embodiment of the present invention.

FIG. 6 mainly describes a process of recovering a transaction state by servers after a failure occurs, where the process mainly includes the following steps:

Step (1): Scanning and finding all UPDATE blocks and WAIT blocks.

Step (2): Scanning the UPDATE blocks, recovering the FTL mapping table, shadowing mapping table, and transaction state table, and determining a transaction state on these blocks. A mapping (LPN, TxID) is written in page metadata and a transaction metadata page is located before all transaction data pages. Therefore. pages on the UPDATE blocks are scanned in sequence.

Step (2.1): determine whether a page (PPN) is a transaction metadata page at first and set a GTT (TxID, PPN) if yes.

Step (2.2) If the page is not a transaction metadata page, determine that the page is a data page, read the page to obtain a TxID, an LPN, and a TxCNT in a page metadata area, and query the GTT by the TAD to find the address of the transaction metadata page.

Step (2.2.1): If the address of the transaction metadata page is recorded in the GTT, which indicates that the transaction has been committed or aborted, and if the transaction on the transaction metadata page is recorded as "committed", update the mapping (LPN, PPN) to the GMT; if the transaction is recorded as "aborted", all pages of the transaction wait for garbage collection.

Step (2.2.2): if the address of the transaction metadata page is not recorded in the GTT, which indicates that the transaction does not enter the second phase, update the mapping (LPN, PPN) to a GST, and in a sequent scanning process, search for a page whose TAD is the same but whose TxCNT is not zero: if the page exists and the quantity of pages related to the transaction is equal to the TxCNT, it indicates that the transaction operation is normally completed and that a vote in the first phase is VOTE-YES. If the page whose TxCNT is not zero does not exist or the quantity of pages related to the transaction is not equal to the TxCNT, the vote in the first phase is VOTE-NO. In this case, mappings of all related pages of the transaction in the GST are set to (LPN, ABORT) in the GST.

In this case. the GST is not recovered completely, and a block that is previously changed from an UPDATE state to a WAIT state still has a transaction that waits for a global transaction decision in the first phase.

Step (3): Scanning the WAIT block, and reading a TxID from the page metadata.

Step (3.1): For a page not recorded in the GTT, recover the GST according to the foregoing step (2.2.2) of scanning the UPDATE blocks. If the page is recorded in the GTT, it indicates that the transaction has been committed or aborted, and the GST mapping does not need to store this part.

In the method according to the present invention, distributed transaction processing in a flash memory does not require state writing that should be performed five times; instead, one transaction metadata page operation and a related mapping table operation are needed, and only a space of approximately one page needs to be occupied; and the FTL mapping table is modified rather than the write-back operation from the log to the page. The method reduces overheads of state recording and temporary version recording. so the performance of the distributed transaction processing is improved; and because the size of a scanned space is smaller during recovery, overheads of transaction state recovery are also smaller.

In addition, other components and functions of the method for distributed transaction processing in a flash memory according to the embodiment of the present invention are well known to a person skilled in the art, and therefore are not further described for brevity.

In the descriptions of the specification, descriptions with reference to terms "an embodiment", "some embodiments", "example", "specific example", or "some examples" shall mean that a specific feature, a structure, a material, or a characteristic described with reference to the embodiment or the example is included in at least one embodiment or example of the present invention. In the specification, exemplary descriptions of the foregoing terms may not refer to a same embodiment or a same example. In addition, the described specific feature, structure, material, or characteristic may be combined in one or multiple embodiments or examples in an appropriate manner.

Although the embodiments of the present invention have been illustrated and described, a person of ordinary skill in the art may understand that changes, modifications, replacements, and variations may be made to these embodiments without departing from the spirit and principle of the present invention. The scope of the present invention is defined by the claims and their equivalents.

We claim:

1. A method for distributed transaction processing in a flash memory, comprising the following steps:
    S1. performing two-phase commit on a transaction and removing a state log record of a two-phase commit protocol, wherein the function and information stored in the state log record of the two-phase commit protocol is internalized as an operation on flash memory metadata in a transaction interface, thereby removing the step of creating and updating the state transaction log file for the two-phase commit; wherein final commit of a coordinator is used as a distributed transaction end identifier;
    S2. in a process of performing the transaction, storing a temporary data object as a shadow version,
        using a shadow mapping table to store an address of the shadow version or the state of a page in the transaction processing, wherein the shadow mapping table is a memory structure that records the address of the shadow version in the first phase of the two-phase commit and records the state of the page participating in the transaction in the second phase of the two-phase commit, using page metadata to record transaction information wherein the page metadata is an out-of-band (OOB) area of a flash memory page, using a transaction metadata page to record a transaction state wherein the transaction metadata page stored in a transaction state table is used to determine whether the transaction is committed or aborted: the shadow mapping table records commit identifier, and the transaction metadata page records transaction commit, and using the transaction state table to record an address of the transaction metadata page, wherein the transaction state table is a persistently stored mapping table, and before the transaction metadata page is written, the transaction state table stores a mapping from a transaction identification (ID) to the address of the transaction metadata page; and S3. when the coordinator or a participant fails, scanning a part of the storage, reading the flash memory metadata, and recovering a FTL mapping table, the shadow mapping table, and the transaction state table to determine the state of the transaction in the two-phase commit with the state log record of the two phase commit protocol removed;

wherein the step S2 further comprises: when the transaction is written, the shadow mapping table stores a location of new data; and the page metadata records logic page number, the transaction ID, and the quantity of transaction pages, and when the transaction is committed, the location of the new data is updated to the FTL mapping table and changed to a user readable state; the shadow mapping table records a commit identifier, and the transaction metadata page records transaction commit; if the transaction is aborted, the shadow mapping table records an abort identifier, and the transaction metadata page records transaction abort, and the new data is set as invalid;

if a flash memory block is used completely and all transactions on the flash memory block are completed, the flash memory block is marked as a CHECKED block; if there is an uncompleted transaction, the flash memory block is marked as a WAIT block; if the flash memory block is partially used, the flash memory block is marked as an UPDATE block; if the flash memory block is not used, the flash memory block is marked as a FREE block; and the first page of the block is used to differentiate a block state;

when a failure occurs in the two-phase commit process, the FTL mapping table, the shadow mapping table, and the transaction state table are recovered to determine the transaction state, and the WAIT block and the UPDATE block are scanned, wherein the step S3, when the coordinator or a participant fails, scanning a part of the storage, reading the flash memory metadata, and recovering the FTL mapping table, the shadow mapping table, and the transaction state table to determine the state of the transaction in the two-phase commit, comprises the following steps:

step (1): scanning and finding all UPDATE blocks and WAIT blocks, step (2): scanning the UPDATE blocks, recovering the FTL mapping table, the shadowing mapping table, and the transaction state table, and determining a transaction state on these blocks: a mapping (Logic Page Number (LPN), transaction ID, (TxID)) is written in page metadata and the transaction metadata page is located before all transaction data ages; and pages on the UPDATE blocks are scanned in sequence; and step (3): scanning the WAIT block, and reading the transaction identification from the page metadata.

2. The method according to claim 1, wherein in the process of performing the transaction by the coordinator or the participant, an additional flash memory page is allocated as the transaction metadata page to record the transaction state in the second phase of the two-phase commit.

3. The method according to claim 1, wherein the page in the shadow mapping table is in the first phase of the two-phase commit; the page metadata is used to determine whether the transaction is ready; and the transaction in the transaction state table is in the second phase of the two-phase commit, wherein the transaction metadata page stored in the transaction state table is used to determine whether the transaction is committed or aborted.

4. The method according to claim 1, wherein the step (2) comprises the following steps:

step (2.1): determine whether a page (Physical Page Number, (PPN)) is a transaction metadata page at first and set a Global Transaction Table (GTT) if yes;

step (2.2): if the page is not a transaction metadata page, determine that the page is a data page, read the page to obtain the transaction ID (TxID), the Logic Page Number (LPN), and a quantity of flash memory pages operated by a transaction on a server (TxCNT) in a page metadata area, and query the GTT by a TAD to find the address of the transaction metadata page;

step (2.2.1): if the address of the transaction metadata page is recorded in the GTT, indicate that the transaction has been committed or aborted, and if the transaction on the transaction metadata page is recorded as "committed", update the mapping (LPN, PPN) to the Global Mapping Table (GMT); and if the transaction is recorded as "aborted", all pages of the transaction wait for garbage collection;

step (2.2.2): if the address of the transaction metadata page is not recorded in the GTT, indicate the transaction does not enter the second phase, update the mapping (LPN, PPN) to a GST, and in a sequent scanning process, search for a page whose TAD is the same but whose TxCNT is not zero; if the page exists and the quantity of pages related to the transaction is equal to the TxCNT, indicate that the transaction operation is completed and that a vote in the first phase is VOTE-YES; if the page whose TxCNT is not zero does not exist or the quantity of pages related to the transaction is not equal to the TxCNT, the vote in the first phase is VOTE-NO; and mappings of all related pages of the transaction in the GST are set to (LPN, ABORT) in the GST; and the step (3) comprises the following step:

step (3.1): for a page not recorded in the GTT, recover the GST according to the step (2.2.2) of scanning the UPDATE blocks; if the page is recorded in the GTT, indicate that the transaction has been committed or aborted.

* * * * *